United States Patent
Obenhaus

[15] 3,683,196
[45] Aug. 8, 1972

[54] DIFFERENTIAL FLUID LEVEL DETECTOR

[72] Inventor: Robert E. Obenhaus, South Easton, Mass.

[73] Assignee: Texas Instruments Incorporated, Dallas, Tex.

[22] Filed: Nov. 27, 1970

[21] Appl. No.: 93,094

[52] U.S. Cl. .................................250/227, 350/96 R
[51] Int. Cl. ...............................................G02b 5/14
[58] Field of Search ............250/227; 350/96 R, 96 B

[56] References Cited

UNITED STATES PATENTS

| | | | |
|---|---|---|---|
| 3,384,885 | 5/1968 | Forbush | 250/227 X |
| 3,192,392 | 6/1965 | Reed | 250/227 |
| 2,976,763 | 3/1961 | McKeag | 250/227 X |
| 3,120,125 | 2/1964 | Vasel | 250/227 X |
| 3,458,705 | 7/1969 | Elmore | 250/227 X |

Primary Examiner—James W. Lawrence
Assistant Examiner—D. C. Nelms
Attorney—Harold Levine, Edward J. Connors, Jr., John A. Haug, James P. McAndrews and Gerald B. Epstein

[57] ABSTRACT

A differential fluid level detector is disclosed for sensing the presence of a fluid medium at first and second preselected levels. The detector includes a light emitter, a longitudinally extending light transmitting body of a predetermined length in excess of the difference between the first and second preselected levels in optical communication with the light emitter for transmitting emitted light along a longitudinal light emission path, a light refracting means in communication with the light emitting means through the light transmitting body and at least one light sensor. The light refracting means includes first and second light refracting body portions which are respectively disposed at longitudinally spaced positions along the light transmitting body corresponding to the first and second preselected levels and each including a light refracting body portion bounded at least in part by a surface portion at an oblique angle with respect to the longitudinal light emission path. The respective surface portions define first and second external reflective interfaces adapted to communicate with the fluid to effect transmission of the emitted light into the fluid when each respective interface is in communication with the fluid and to effect internal reflection of the light when each respective interface is not in communication with the fluid along a predetermined light reflection path through the light transmitting body. The light sensor is disposed in optical communication with the predetermined light reflection path.

12 Claims, 4 Drawing Figures

PATENTED AUG 8 1972

INVENTOR.

BY Robert E. Obenhaus

Gerald B. Epstein Atty.

INVENTOR.

BY Robert E. Obenhaus

Att'y.

DIFFERENTIAL FLUID LEVEL DETECTOR

Various types of liquid level detector devices are presently available for use in sensing the presence or absence of a liquid at a preselected level or depth within a container. Such devices generally are mechanically or electrically operated and in certain instances may be subject to operational efficiencies and also may be quite cumbersome. Mechanical devices of this nature generally utilize suitable floats or other such arrangements for mechanically sensing the presence of a liquid at predetermined depths and are subject to attendant problems of eventual wear of moving parts, necessity for lubrication or other periodic maintenance, etc. In addition, certain mechanical devices utilized for sensing plural fluid levels may require a plurality of sensing devices making miniaturization extremely difficult to achieve and may be relatively uneconomical. Electrical devices of this type generally utilize electrical sensing devices which must be disposed in a position for contacting the liquid being sensed in order to provide an indication of the presence of the liquid at various depths. However, such arrangements necessarily require a dependence upon continued satisfactory operation of an electrical device subject to an adverse environment, i.e., moisture, and are subject to eventual degradation of properties and inoperability.

Accordingly, it is an object of the present invention to provide an improved differential fluid level detector device adapted to sense the presence or absence of a fluid at preselected levels.

It is another object of the present invention to provide an improved differential liquid level detector device which is adapted to sense the presence or absence of a liquid medium at preselected levels and which is extremely durable in use and economical to fabricate.

Various additional objects and advantages of the present invention will become readily apparent from the following detailed description and accompanying drawings wherein.

Figure 1:
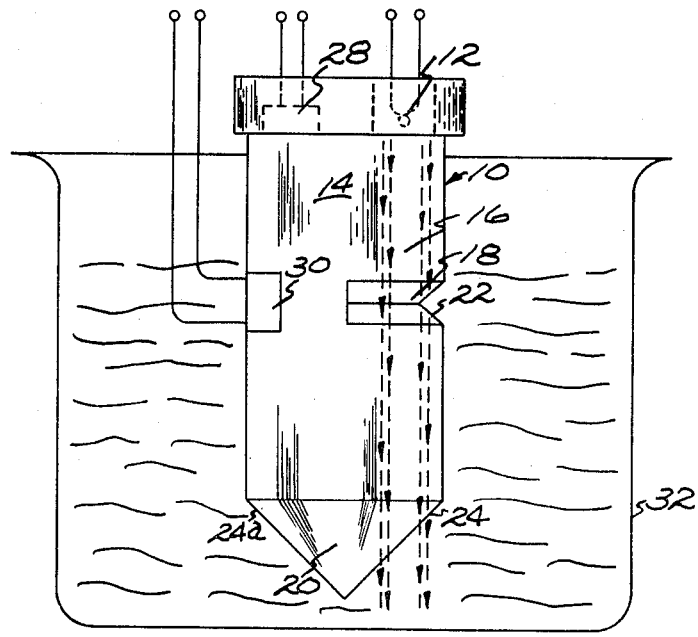
FIG. 1 is an elevational view of a typical differential liquid level detector in accordance with the present invention which is in contact with a liquid medium.
Figure 2:
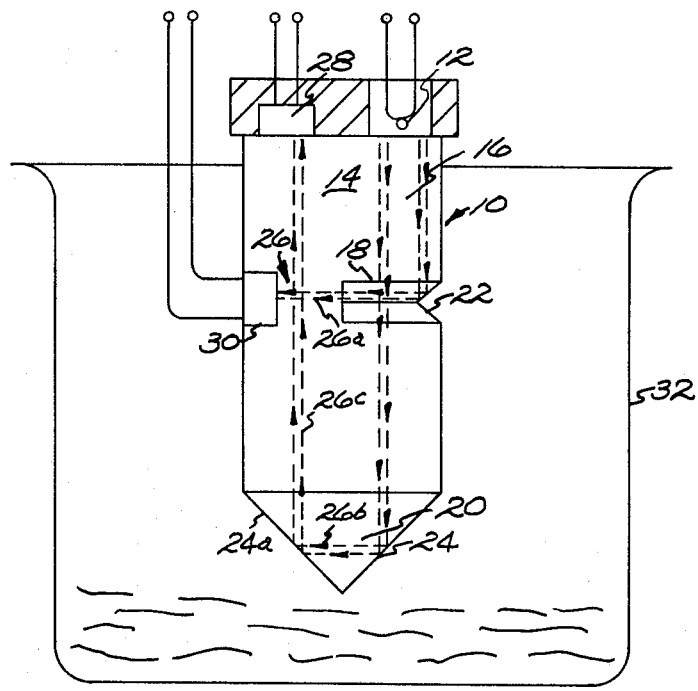
FIG. 2 is a sectional view of the device of FIG. 1 but illustrating the device in a position in which it is not in contact with the liquid.

Referring generally to the drawings and in particular initially to FIGS. 1 and 2, the detector is indicated generally by the reference numeral 10 and includes a light emitting means 12 and a longitudinally extending light transmitting body 14 of a predetermined length in excess of the difference between first and second preselected fluid levels which are to be detected, the light transmitting body 14 being in optical communication with the light emitter and adapted to transmit emitted light along a longitudinal light emission path 16 therethrough. In addition, a first and second light refracting means 18 and 20 are provided each of which is bounded at least in part by a surface portion 22, 24 respectively arranged at an oblique angle with respect to the longitudinal light emission path 16 to define first and second external reflective interfaces. The reflective interfaces 22, 24 are positioned at longitudinally spaced locations along the light transmitting body 14, corresponding to the first and second preselected levels and are adapted to contact the fluid so as to effect transmission of the emitted light therethrough, when the respective interface is in contact with the fluid, while effecting internal reflection of the emitter light along a predetermined light reflection path 26 through the body 14 when the respective interface is not in contact with the fluid. In this regard, light internally reflected from the interface 22 is reflected along a first portion 26a of the predetermined light reflection path (FIG. 2) while light reflected from the interface 24 is reflected initially along a second portion 26b of the light reflection path and then along a third portion 26c of the light reflection path. In addition, at least one light sensor 28 is disposed in optical communication with the light reflection path 26, the light sensor having an electrical property which varies in response to the incidence of light thereon for sensing the presence of reflected light as an indication of the absence of fluid at a particular level. In this regard, in the illustrated embodiment, the light sensor 28 is in optical communication with light reflected from the interface 24, 24a and hence is adapted to indicate the absence of liquid at the first preselected fluid level corresponding to the longitudinal position of the interface 24, while another light sensor 30 is provided in optical communication with the portion 26a, light path 26 to sense light reflected from the interface and hence is adapted to provide an indication of the absence of fluid at the second preselected fluid level corresponding to the longitudinal position of the interface 22.

Although the detector 10 is illustrated in a vertical orientation depending within an enclosure or casing 32, it may be arranged in various orientations and utilized for detecting the presence or absence of a variety of fluid media at different levels within a container and may be readily adapted for maintaining a fluid level within a container between preselected levels. In addition, if desired, a suitable lens may be coupled to the light emitter 12 for suitably focusing or otherwise positioning the light emitted along the predetermined light emission path 16.

The light transmitting body 14 preferably comprises a solid, light transparent medium fabricated of a suitable glass, a plastic material, such as crown glass, flint glass, plexiglas, etc., which efficiently transmits optical radiation and, as shown, is preferably arranged in a generally cylindrical configuration in order to facilitate fabrication, as well as to obviate the need for critical rotational orientation of the light emitter and the light sensor with regard to the external reflective interfaces 22, 24. In this regard, each of the light refracting body portions 18, 20 essentially comprises a prismatic body preferably integrally formed from the light transmitting body 14, although, if desired, the portion 20 at the end of the body 14 opposite to the light emitter 12 and light sensor 28 may be formed separately and suitably secured to the body 14 in light transmitting relationship therewith. More particularly, the body portion 20 has a predetermined geometric shape and is preferably of generally conical configuration integrally formed at one end of the light transmitting body 14 opposite to that end at which the light emitter 12 and light sensor 28 are arranged. It should be noted in this regard that the prismatic body 20 also may be formed in other geometric shapes if desired, such as a paraboloid, hyperboloid, hemisphere, etc., the essential feature being the provision of at least two non-parallel surface portions in the path of the emitted light such that the requisite internal light reflection may be achieved. In this regard, the body portion 20 includes the external reflective interface 24 which may be seen to be defined by a portion of the surface of revolution of the conical configuration, while another external interface 24a is defined by another portion of the surface of revolution of the conically shaped body 20, which is located in aligned, spaced, facing relationship with regard to the external interface 24, but angularly spaced therefrom by approximately 180°. Accordingly, as light is internally reflected from the interface 24, as will be more particularly explained in detail hereinafter, at an angle generally normal to the light emission path 16, such reflected light impinges upon the oppositely disposed facing external light reflecting interface 24a in a manner such that the latter external interface may similarly internally reflect the light, but in a direction toward the light sensor 28 so as to cause the light sensor 28 to provide an indication of the presence of the internal reflection of light, as an indication of the absence of the fluid medium in contact with the external interfaces 24, 24a.

As shown, the vertex of the conically shaped body 20 is oriented in a direction generally facing the fluid the presence of which is being detected. In addition, in order to maximize the internal light reflection, the included angle at the vertex is between approximately 60 and 90° and preferably is approximately 90°. The external interface 22 which bounds the body portion 18 is formed at a predetermined longitudinal position along the surface of revolution of the generally cylindrically shaped light transmitting body 14 corresponding to the second preselected fluid level which is to be detected. More particularly, the external interface 22 is essentially defined by a generally bevel-shaped notch formed around a preselected portion of the periphery of the cylindrically shaped body 14 preferably circumscribing approximately 180° of the circumference thereof and having its vertex extending a predetermined distance inwardly into the light emission path 16. In this regard, by providing a conically shaped body portion 20 having the reflective interfaces 24, 24a at the one end of the light transmitting body portion corresponding to the first preselected fluid level and by similarly having a light reflecting external interface 22 at the second preselected fluid level with the latter circumscribing approximately half of the circumference of the cylindrically shaped body 14, problems of involving rotational orientation of the light emitter 12 and light sensor 28 are substantially alleviated as long as at least a portion of the light emission path 16 passes through the external interface 22. Furthermore, as previously mentioned, the inner vertex of the external interface 22 extends a predetermined distance transversely into the light emission path 16 and preferably terminates at a location approximately one-half way through the light emission path 16, such that the interface 22 may internally reflect approximately half of the emitter light when the interface is not in contact with the fluid medium, while permitting the remaining half of the emitted light to pass unimpededly adjacent thereto.

The light sensor 30 which is disposed in optical communication with the external interface 22 along the light reflection path 26a, as shown, is also arranged at a longitudinal position along the cylindrically shaped body 14 such that it is in alignment with the external interface 22. In this regard, the light sensor 30 may be arranged at the surface of the cylindrical body 14 for sensing reflected light from the external interface 22 or may be suitably embedded within the wall of the cylindrical body 14, as shown. Similarly, the light sensing device 28 is arranged in optical communication with the light reflection path 26, as shown, and may be mounted at the end of the light transmitting body 14 opposite to that at which the body portion 20 is located and in spaced relationship from the light emitter 12. In this regard, it may be noted that the light emitter 12 is preferably somewhat recessed from the end of the light transmitting body portion 14 such that optical isolation between the light emitter 12 and the light sensor 28 is provided except for the selective optical communication which is provided along the predetermined light reflection path 26. In this regard, if desired, a suitable light baffle could be disposed intermediate the light emitter 12 and the light sensor 28 to achieve the requisite optical isolation therebetween. Both the light sensor 28 and the light sensor 30 preferably comprise suitable photoelectric cells, each having an electrical resistance which varies in response to the incidence of light thereon, although various other light sensors such as phototransistors, light responsive diodes etc., could be utilized. The photoelectric cells generally have a relatively high resistance in the absence of incident light and a relatively low resistance in response to the incidence of light thereon, the resistance decreasing in response to the intensity of the incident light. In addition, as will be presently explained in detail, in certain preferred embodiments, a single light sensor may be utilized for sensing reflected light from several longitudinally spaced external interfaces. In such instances, the resistance of the light sensor which varies in response to the intensity of the light incident thereon, which in turn, is dependent upon whether light is being reflected from one location or several locations, provides an indication of the presence or absence of fluid at various levels. In addition, if desired, the light sensor and light emitter which are arranged at the one end of the light transmitting body 14 may be suitably packaged in a hermetically sealed enclosure such as various presently available types of enclosures utilized for miniaturized semiconductor devices with the enclosures being suitably secured in sealed relationship to the end of the body 14. In this regard, a conventional TO-5 enclosure, for example, may be utilized in which the light source and light emitter are mounted therein, together with any associated electrical circuitry, while suitable openings may be provided in the header section to permit the passage of light from the light emitter and to the light sensor. In such instances, the light source may comprise a light emitting diode, for example, while the light sensor may comprise a photodiode or phototransistor for example.

It may be seen that each of the light refracting body portions 18, 20 essentially comprises a light prismatic body having light transmission characteristics essentially identical to those of the light transmitting body 14, while each of the body portions 18, 20 is bounded, in part at least, by a surface portion which is at an oblique angle with respect to the light emission path 16. In addition, by arranging the portions 18, 20 within the light emission path 16, it may be seen that, when fluid is present at a level above the first and preselected levels, as in FIG. 1, the emitted light passes through the external interfaces 22, 24, as shown, whereas, when fluid is below one or both of the first and second preselected fluid levels light is internally reflected along the light reflection path portion 26a, when the fluid is below the interface 22, and along the portions 26b, 26c, when the fluid is below the interface 24, as shown in FIG. 2. Thus, the detector 10 is particularly suitable for detecting the presence of fluid at first and preselected fluid levels and also may be readily arranged to function as a differential fluid level detector for maintaining the fluid level between such preselected depths by coupling the detector to a suitable pump, valve, etc., as will be explained hereinafter in which a drop in the fluid level is sensed and utilized for energizing the pump, valve, etc., in order to affect the entry of additional fluid into the container to achieve the desired depth. In addition, it should be noted that the body portions 18, 20 may be fabricated in various geometric shapes as long as each is bounded at least in part by a surface portion at an oblique angle with respect to the longitudinal light emission path so as to permit light to pass therethrough into the fluid medium, when the fluid medium is present, while light is internally reflected from the respective external interface, when the fluid medium is not in contact therewith.

To briefly summarize the operation of the detector 10 illustrated in FIGS. 1 and 2, it may be initially noted that in the presence of fluid at a level above the first and second preselected fluid levels light which is emitted by the light emitter 12 is transmitted along the light emission path 16. In this connection, a portion of the emitted light passes adjacent to the interface 22 through the external interface 24, and into the fluid medium. Similarly, the remainder of the emitted light passes through the interface 22 and into the fluid in contact therewith. Accordingly, essentially no light is internally reflected and no reflected light is incident on the light sensors 28, 30, which, thus remain in their high resistance or unenergized mode. Referring now to FIG. 2, in which the fluid level has dropped to a depth at which it is no longer in contact with either of the interfaces 22, 24 and hence is below the first and second preselected fluid levels, it may be initially noted that approximately half of the light which is emitted along the light emission path 16 and is incident upon the interface 22 is internally reflected by this interface along the light reflection path 26a in a direction approximately normal to the light emission path and toward the light sensor 30, which is in optical communication with the portion 26a of the light reflection path. Accordingly, this reflected incident light energizes the light sensor 30, causing it to shift into its low resistance mode, thereby providing an indication of the drop in fluid level to a level below the second preselected level associated with the longitudinal position of the interface 22. The light sensor 30, may, of course, be suitably connected to an indicating or detecting circuit, or the like, for sensing the shift in the resistance mode thereof as an indication of a drop in the fluid level. In addition, approximately one-half of the emitted light which is transmitted along the light emission path 16 passes adjacent to the interface 22 without contacting this interface and, hence, proceeds unimpededly through the light transmitting body 14 to the external interface 24. Since the external interface 24 is not in contact with fluid, light is internally reflected along the portion 26b of the light reflection path, as shown, at an angle approximately normal to the light emission path and impinges upon the external interface 24a. Similarly, the external interface 24a is not in contact with the fluid and hence light is internally reflected by the interface 24a along the portion 26c of the light reflection path in a direction generally normal to the portion 26b of the light reflection path and toward the light sensor 28, as shown. It may be of interest to note that the portion 26c or the light reflection path is substantially parallel to the light emission path 16, although the emitted and reflected light travel in opposite directions, due to the conical configuration of the body 20 and the oppositely disposed external interfaces 24, 24a, which in turn, permits the placement of the light sensor and the light emitter at a common end of the light transmitting body 14. This reflected light, which travels along the portion 26c of the light reflection path, is incident upon the light sensor 28 effecting energization thereof and causing the light sensor 28 to shift into its low resistance mode. This change in resistance similarly may be sensed by coupling the light sensor 28 to an appropriate electrical circuit or the like, to indicate the absence of fluid at the first preselected fluid level associated with the external interfaces 24, 24a. Thus, it may be seen that the differential liquid level detector 10 utilizes optical coupling principles for providing an indication of the presence or absence of liquid at preselected levels within the container.

Figure 3:
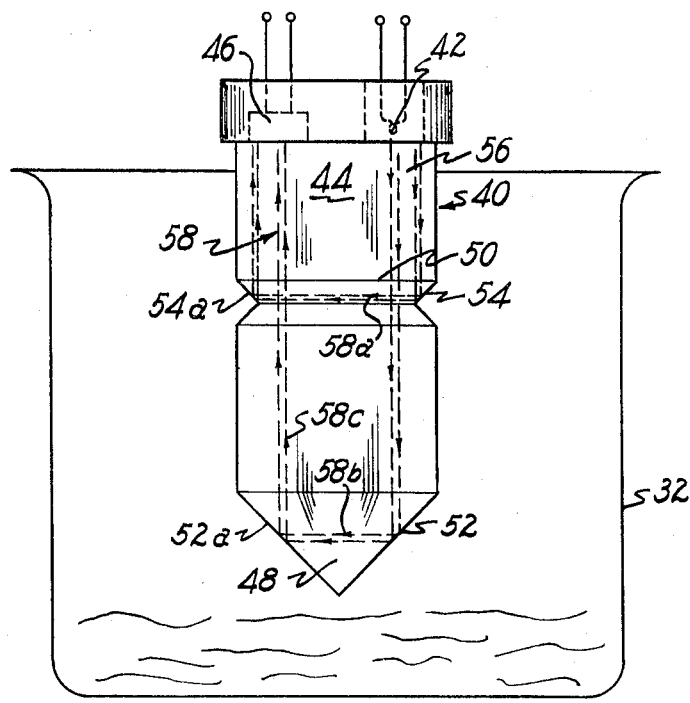
FIG. 3 is an elevational view of an alternative embodiment of a differential liquid level detector in accordance with the present invention.

Referring now in detail to FIG. 3, an alternative embodiment of the present invention is illustrated in which only a single light sensor is utilized, rather than a pair of light sensors, the single light sensor being arranged such that its resistance varies in response to the intensity of incident light thereon, while the intensity of the incident light depends upon whether the light is reflected from one or from more than one location. More particularly, in the embodiment illustrated in FIG. 3, a detector 40 is provided which is similar to that illustrated in FIGS. 1 and 2. A light emitter 42 is provided similar to the light emitter 12, and is arranged at one end of a light transmitting body 44 similar to the body 14, while a light sensor 46 generally similar to the light sensor 28 is arranged at a common end of the light transmitting body 44 with the light emitter 42. The light transmitting body 44 is generally cylindrical in form and similarly includes light refracting body portions 48 and 50 respectively arranged at the end of the light transmitting body 44 opposite to that at which the light emitter 42 and light sensor 46 are disposed and at an intermediate position on the body 44, corresponding respectively to the first and second preselected fluid levels. The light refracting body portion 48 is generally similar to the corresponding portion 20 as described in FIGS. 1 and 2 and may have a generally conical configuration having an included angle of approximately 90° at its vertex and bounded at least in part by a surface portion 52 defining an external interface which is at an oblique angle with respect to light being emitted by the light emitter 42. Similarly, the light refracting body may be bounded in another part by another surface portion 52a which defines another external interface arranged in aligned facing relationship with respect to the interface 52 but rotationally spaced therefrom by approximately 180°. Accordingly, light is internally reflected by the external interfaces 52, 52a, as described in connection with the FIG. 1 and 2 embodiment. The body portion 50 is bounded at least in part by a surface portion defining an external interface 54, which similarly is at an oblique angle with respect to light emitted by the light emitter. Accordingly, it may be noted that the respective external interfaces of each of the light refracting body portions are adapted to internally reflect light when fluid is not present in contact therewith at the first and second preselected fluid levels and to transmit light therethrough with little or not internal reflection, when fluid is present and in contact therewith.

However, the detector 40 differs structurally from the detector 10 illustrated in FIGS. 1 and 2 in that, rather than including a bevel-shaped notch portion defining the external interface 22, which circumscribes only approximately one-half of the cylindrical surface of the light transmitting body 44, a generally bevel-shaped notch surrounds the body portion 50 and has an internal included angle of approximately 90° defining the external interface 54 and essentially completely circumscribing the outer periphery of the cylindrically shaped body 44 at a longitudinal position corresponding to the second preselected fluid level. Such an arrangement obviates the need for a second light sensor in optical communication with the interface 54 and also obviates any need for critical rotational positioning of the light emitter and light sensor. More particularly, the external interface 54 is arranged in general aligned spaced relationship and in optical communication with another external interface defined by a surface portion 54a rotationally spaced therefrom by approximately 180° along the periphery of the notch circumscribing the body portion 48. Consequently, another light reflection surface is provided in optical communication with the light reflecting surface 54 and is effective to internally reflect light, when the interface 54a is not in contact with the fluid medium.

To briefly describe the operation of the embodiment illustrated in FIG. 3, it may be initially noted that the light is transmitted along a light emission path 56 from the light emitter 42. The bevel-shaped notch which defines the external interface 54 extends inwardly from the peripheral surface of light transmitting body 44 a predetermined distance such that approximately one-half of the emitted light along the light emission path 56 is incident thereon, while the remainder of the emitted light passes adjacent thereto impinging upon the external interface 52. When fluid is present at the first preselected level corresponding to the location of the external interface 52, the emitted light passes through the interface 52 and into the medium with essentially little or no internal reflection of light. Similarly, when fluid is present at the second preselected level corresponding to the interface 54, light passes through the interface 54 with little or no internal reflection. However, when fluid is not present at the respective interfaces as shown in the FIG. 3 illustration, light is internally reflected at the interface 54 and similarly light is internally reflected at the interface 52 along a light reflection path generally indicated by the reference numeral 58, the light sensor 46 being in optical communication with the light reflection path 58. More particularly, when light is reflected from the interface 54 it is reflected along a first portion 58a of the light reflection path at an angle generally normal to the light emission path 56 and is incident upon the interface 54a. Light is similarly internally reflected by the interface 54a, as shown, at an angle generally normal to the portion 58a and along the light reflection path 58 toward the light sensor 46. Similarly, the emitted light which passes adjacent to the interface 54 and is incident upon the interface 52, is similarly reflected along a second portion 58b of the light reflection path and is incident upon the interface 52a. Light is similarly internally reflected by the interface 52a at an angle generally normal to the path 58b and along a portion 58c of the light reflection path, the portion 58c being generally parallel to the light emission path 56 and extending toward the light sensor 46. Thus, it may be seen that when fluid is not present at the second preselected level corresponding to the external interface 54, a predetermined amount of light is internally reflected back to the light sensor 46, as an indication of the absence of fluid at this level. Similarly, when fluid is not present at the first preselected level corresponding to the position of the interface 52, another predetermined portion of the emitted light is reflected back to the light sensor 46. Thus, the intensity of the light incident on the light sensor 46 is dependent upon whether light is reflected from one or both of the external interfaces and, hence, the variation in resistance of the light sensor 46 may be sensed as an indication of the absence of fluid at the first and second preselected levels. Furthermore, it should be noted in this regard, that if desired, the detector 40 may be arranged to differentially sense fluid levels at more than two levels by the provision of additional external interfaces similar to the interfaces 54, 54a, if desired.

Figure 4:
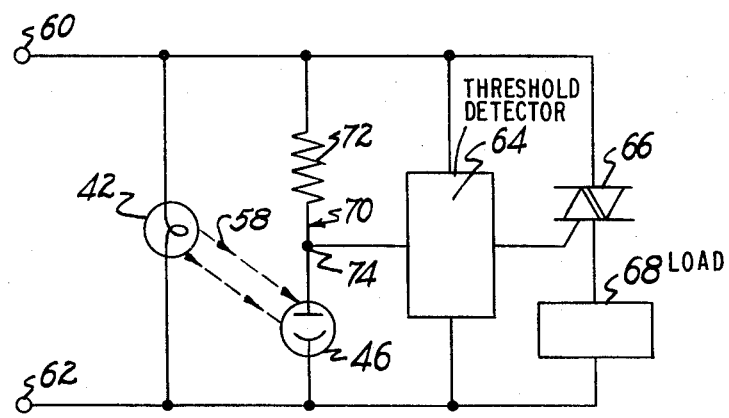
FIG. 4 is a schematic circuit diagram of an electrical circuit adapted to be incorporated in a differential liquid level detector in accordance with the present invention.

Referring now to FIG. 4, a typical embodiment of an electrical circuit is illustrated which is adapted for incorporation within a detector, such as illustrated in FIGS. 1-3. More particularly, as shown, the light emitter 42 is coupled to a pair of power supply terminals 60, 62 connected to a suitable low voltage power supply (not shown), while the light emitter 42 is selectively optically coupled to the light sensor 46 along the light reflection path 58. In addition, a suitable threshold detector circuit 64, which may comprise one of a variety of threshold detecting circuits such as a Schmidt trigger, or the like, is connected across the light sensor 46 for sensing variations in the resistance thereof by sensing variations in the voltage levels developed thereacross, when the resistance level of the sensor varies in response to the incidence of light thereon. The output of the threshold detector circuit 64 may be coupled to a suitable selectively energizable switch means, which is rendered conductive in response to the production of an output signal by the threshold detector circuit 64 in response to variations in the sensed resistance value of the light sensor 46. If desired, a suitable load 68 may be serially connected to the switch means 66 and is adapted to be energized in response to conduction of the switch means 66. In this regard, the light sensor 46 is preferably arranged as one leg of a voltage divider configuration 70, while the other leg comprises a resistor 72, which cooperates with the light sensor 46 to define a junction 74 therebetween, this junction 74 being coupled to the threshold detector 64 such that the voltage level established at the junction, which in turn depends upon the relative resistance value of the light sensor 46 controls the conduction of the threshold detector 64 and hence of the switch means 66. As previously explained, the light sensor 46 preferably comprises a device which is sensitive to incident light thereon such as a photoelectric cell, a light responsive transistor, a light sensitive diode, etc., although in a preferred embodiment the light sensor 46, comprises a photoelectric cell. As a result, in the absence of incident light upon the photoelectric cell 46 it remains in a relatively high resistance mode, while in the presence of light incident thereon its resistance decreases substantially in proportion to the intensity of the light incident thereon. Accordingly, by sensing the resistance level of the photoelectric cell 46 an indication is provided of the intensity of incident light thereon as a measure of whether reflected light is being provided from one external interface or from more than one external interface of the detector. Thus, an indication is provided of the relative fluid level. In the absence of incident light upon the photoelectric cell 46 light emitted by the light emitter 42 does not reach the photoelectric 46 which remains in its high resistance mode. The threshold detector 64 coupled to the junction 74 is arranged such that it remains in its unenergized state in response to the establishment of a relatively high voltage at the voltage at the junction 74, corresponding to the high voltage mode of the photoelectric cell 46. Similarly, the threshold detector 64 is energized to produce an output signal in response to a variation or lowering of the voltage level at the junction 74, corresponding to a shift in the resistance of the photoelectric cell 46 into its low resistance mode. Accordingly, in the absence of incident light upon the photoelectric cell 46, the threshold detector 64 does not energize the selectively energizable switch means 66 and no signal is provided to the load 68. However, in response to the presence of incident reflected light upon the photoelectric cell 46, the resistance thereof decreases substantially and hence the voltage level at the junction 74 similarly decreases. This decrease in voltage is sensed by the threshold detector 64 which supplies an energizing signal to the switch means 66 to render the switch means conductive and hence supply energizing signals to the load 68. Similarly, if desired, the threshold detector 64 may be arranged such that it is rendered more highly conductive in response to a further decrease in the voltage level at the junction 74 accompanying a decreased level of resistance of the photoelectric cell 46 due to an increase in the intensity of incident reflected light thereon, such as occurs when reflected light reaches the photoelectric cell 46 from the interface 52 as well as the interface 54. Thus, when the fluid level drops to a level below the level corresponding to the interface 54, light is incident on the photoelectric cell 46, but the threshold detector is preferably arranged to remain unenergized, until a further decrease in the threshold detector resistance of the photoelectric cell 46 occurs in response to additional light incident thereon accompanying a drop in the fluid level and exposure of the interfaces 52, 52a. When the fluid level drops to this level, i.e., below the interfaces 52, 52a, additional reflected light is incident on the photoelectric cell 46 to cause the threshold detector to be energized in order to energize the load 68.

In the illustrated embodiment, the switch means 66 preferably comprises a suitable semiconductor switch device having a control element coupled to the threshold detector 64, such as a triac having its gate coupled to the threshold detector 64, as shown, and having its anodes connected to the load 66 such that the production of an output signal from the threshold detector 64 in response to a sensed decrease in the voltage level at the junction 74 renders the triac conductive and energizes the load 68. The load 68 may comprise a suitable energization circuit for a pump, valve, etc., arranged such the energization of the load 68 in response to a fluctuation in the fluid level, below either of the external interfaces effects energization of the pump or valve so as to cause fluid to flow into the container in order to raise the fluid level.

It may be noted that if the circuit of FIG. 4 were to be incorporated in a detector employing more than one light sensor, it would be merely necessary to serially connect the additional light sensors to the light sensor 46. In such an embodiment a drop in the fluid level would cause a drop in the resistance of the light sensor in optical communication with the particular associated external interface hence energizing the threshold detector 64 so as to effect energization of the load 68. Accordingly, it may be seen that a convenient means is provided for maintaining a fluid at desired levels within a container.

Several embodiments of a differential fluid level detector have been described, as well as an electrical circuit particularly adapted for incorporation therein and suitable for use in energizing external apparatus for maintaining the fluid at desired levels in response to fluctuations therein.

Various changes and modifications in the above-described embodiments will be readily apparent to those skilled in the art and any such changes or modifications are deemed to be within the spirit and scope of the present invention as set forth in the appended claims.

I claim:

1. A differential fluid level detector for sensing the presence of a fluid at first and second preselected levels comprising a light emitter, a single longitudinally extending light transmitting body of a predetermined length in excess of the difference between said first and second preselected levels in optical communication with said light emitter and adapted to transmit the emitted light along a longitudinal light emission path therethrough, light refracting means in communication with said light emitting means through said light transmitting body, said light refracting means including a first and a second light refracting body each bounded at least in part by a surface portion at an oblique angle with respect to the longitudinal light emission path, said first light refracting body defining one end of said light transmitting body and being adapted to sense fluid at said first preselected level, said second light refracting body being longitudinally spaced from said first light refracting body and being defined by an inwardly extending circumferential groove which substantially completely circumscribes a portion of said light transmitting body and being adapted to sense fluid at said second preselected level, said respective surface portions defining first and second external reflective interfaces positioned at locations along said light transmitting body corresponding to said first and second preselected levels and adapted to communicate with the fluid to effect transmission of the emitted light into the fluid when each respective interface is in communication with the fluid and to effect internal reflection of the light when each respective interface is not in communication with the fluid along a predetermined light reflection path through the light transmitting body, and light sensing means having an electrical property which varies in response to the incidence of light thereon disposed in optical communication with said predetermined light reflection path for sensing the presence of reflected light as an indication of the absence of fluid at the first and second preselected levels.

2. A detector in accordance with claim 1 wherein said second light refracting body is in optical communication with a portion of the longitudinal light emission path and said first light refracting body is in optical communication with the remainder of the longitudinal light emission path to permit a portion of the emitted light to be internally reflected along a first portion of said predetermined light reflection path by said second body and the remainder of the emitted light to be internally reflected along a second portion of said predetermined light reflection path by said first body in the absence of fluid in communication with said first and second body portions.

3. A detector in accordance with claim 2 wherein said light emitter and said light sensor are disposed in mutually spaced relationship at a common end of said light transmitting body, said first light refracting body is at an opposite end of said light transmitting body, and said second light refracting body is longitudinally positioned intermediate said common end of said light transmitting body and said first light refracting body.

4. A detector in accordance with claim 3 wherein another light sensor is disposed in aligned spaced facing relationship with respect to said second external reflective interface and in optical communication with said first portion of said predetermined light reflection path for sensing the absence of fluid at the level associated with said second external reflective interface.

5. A detector in accordance with claim 3 wherein said first light refracting body portion comprises a prismatic body having a predetermined geometric configuration adapted to effect internal reflection of light transmitted onto said first external reflective interface from said light emission path along said second portion of said predetermined light reflection path at an angle generally normal to said light emission path.

6. A detector in accordance with claim 5 wherein said light sensor has an electrical resistance which varies in response to light incident thereon and has a relatively high resistance value in the absence of incident light and a relatively lower resistance value in response to incident light thereon, said lower resistance value decreasing in response to the intensity of the incident light.

7. A detector in accordance with claim 6 wherein said light sensor comprises a photoelectric cell and a selectively energizable voltage responsive means is coupled to said photoelectric cell for sensing the variations in resistance thereof and providing an output signal in response to a sensed decrease in the resistance of said photoelectric cell as an indication of a fluctuation in the fluid level being detected.

8. A detector in accordance with claim 7 wherein a voltage divider is provided including a resistor having a preselected resistance value which is less than the high resistance value of said photoelectric cell in the absence of incident light and having a junction defined intermediate said photoelectric cell and said resistor, said voltage responsive means being coupled to said junction for providing the output signal in response to variations in the voltage level at said junction due to variations in the resistance of said photoelectric cell.

9. A detector in accordance with claim 5 wherein said light transmitting body comprises a generally cylindrical body of a predetermined light transparent medium, and said first light refracting body portion comprises a generally conically shaped prismatic body having its base arranged in mating light transmitting contact with said opposite end of said light transmitting body and having its vertex oriented in a direction facing the fluid to be detected, one portion of the surface of revolution of said conically shaped prismatic body defining said first external reflective interface and another portion of the surface of revolution being in aligned, spaced, facing relationship with said first external reflective interface and defining a third external reflective interface adapted to internally reflect light from said second portion of said predetermined light reflection path at an angle generally normal to said second predetermined light reflection path along a third predetermined light reflection path toward said light sensor.

10. A detector in accordance with claim 9 wherein said first portion of said predetermined light reflection path is generally normal to the path of the emitted light and a fourth external reflective interface is disposed in transversely aligned relationship with said second external reflective interface and in optical communication therewith along said first portion of said predetermined light reflection path and spaced from said second external reflective interface by a portion of said light transmitting body, said fourth external reflective interface being adapted to internally reflect incident reflected light from said first portion of said predetermined light reflection path along a fourth portion of said predetermined light reflection path in a direction generally normal to said first portion of said predetermined light reflection path and parallel to said light emission path toward said light sensor when said fourth external reflective interface is not in communication with the fluid.

11. A detector in accordance with claim 10 wherein said second and fourth external light reflective interfaces are respectively defined by a generally bevel-shaped circumferential notch generally circumscribing and extending inwardly from the outer wall of said cylindrical light transmitting body for a predetermined distance, the inward extend of said notch terminating within the light emission path and being adapted to internally reflect a portion of the emitted light toward an opposed portion of said notch while permitting unimpeded passage of the remainder of the emitted light, said opposed notch portion terminating at a point spaced from said third portion of said predetermined light reflection path so as to avoid interference therewith and being adapted to reflect light along said fourth portion of said predetermined light reflection path toward said light sensor.

12. A detector in accordance with claim 11 wherein said light sensor comprises a photoelectric cell having a resistance which varies in response to the incidence of light thereon, the resistance of said photoelectric cell being relatively low in the absence of incident light and decreasing in a manner systematically related to the intensity of incident light thereon, wherein a voltage divider is provided including a resistor having a preselected resistance value which is less than the high resistance mode resistance level of said photo-electric cell and having a junction defined intermediate said photoelectric cell and said resistor, and a selectively energizable voltage responsive means coupled to said junction for sensing variations in the voltage level established at said junction as a result of variations in the resistance level of said photoelectric cell due to fluctuations in the fluid level being detected.

* * * * *